June 5, 1923.
C. P. RUPPE
GATE FASTENER
Filed March 3, 1921
1,458,079
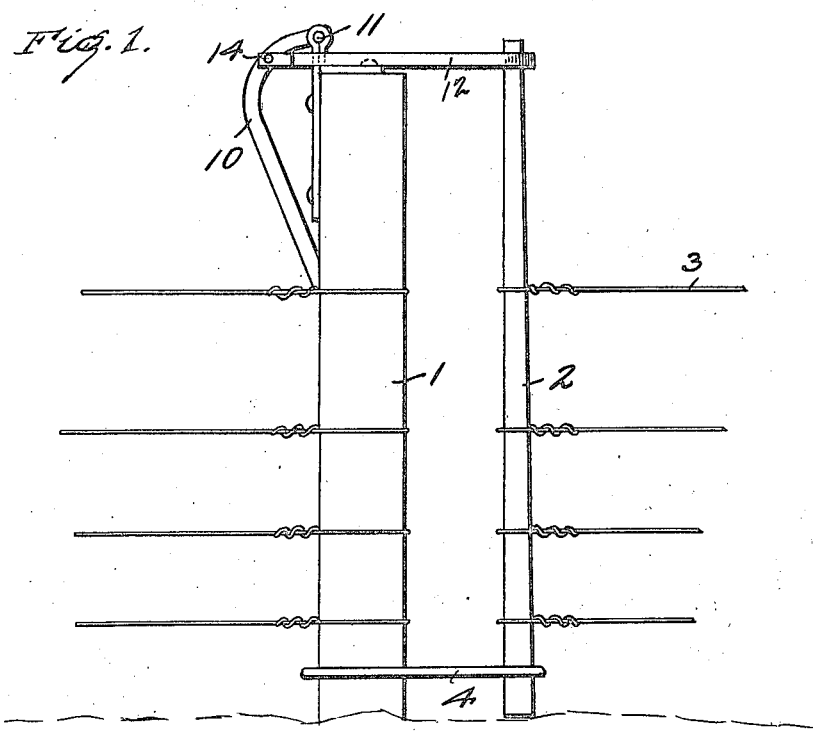
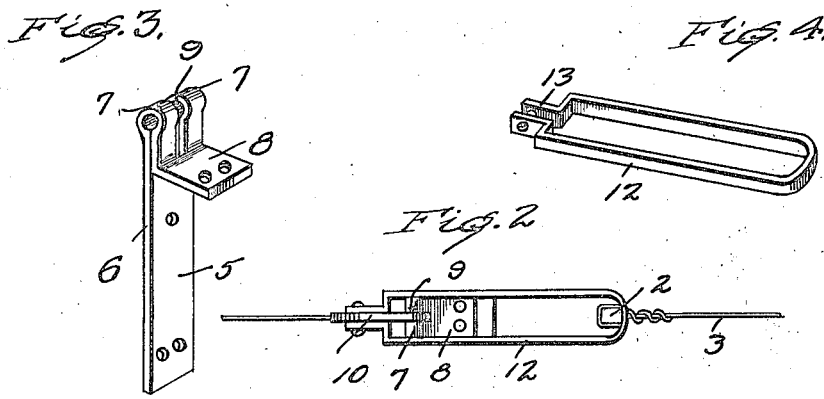
Inventor
Cecil P. Ruppe
Witnesses
By 
Attorney Patented June 5, 1923.

1,458,079

UNITED STATES PATENT OFFICE.

CECIL P. RUPPE, OF OAKLEY, KANSAS.

GATE FASTENER.

Application filed March 3, 1921. Serial No. 449,413.

*To all whom it may concern:*

Be it known that I, CECIL P. RUPPE, a citizen of the United States, residing at Oakley, in the county of Logan and State of Kansas, have invented certain new and useful Improvements in a Gate Fastener, of which the following is a specification.

This invention relates to a gate fastener and has for its principal object to provide a device of this nature which is especially useful in connection with wire gates and which will not only retain the gate wires in a comparatively taut position but which is so constructed as to enable the gate to be readily unlocked.

Another object of the invention is to provide a device of this nature which may be manufactured at a comparatively low cost and is constructed so as to be easily manipulated.

With the above and numerous other objects in view this invention comprises certain novel features of construction, the arrangement and combination of parts as will be hereinafter more fully described and claimed.

In the drawing:—

Figure 1 is a front elevation of the complete invention including the necessary portions of the gate and fence.

Figure 2 is a top plan view of the device,

Figure 3 is a perspective view of the strap used in connection therewith, and

Figure 4 is a perspective view of the bale used in connection therewith.

Referring to the drawing in detail it will be seen that 1 represents the end fence post which is situated adjacent the passageway desired to be closed by the gate. The gate post 2 is situated adjacent thereto and is provided with the usual strands of wire 3 and it is the object of the present invention to cause these wires 3 to take a taut position and prevent same from becoming loosened and sagging, so that the gate not only presents a good appearance but will remain in a secured closed position.

A bale 4 may be secured to the fence post 2 and is adapted to receive the bottom portion of the gate post 2. Upon the upper end of the fence post 1 there is mounted the strap 5 shown in detail in Figure 3. It will be seen that this strap 5 includes the plate 6 which is bent adjacent its upper end so as to form the journals 7 and the retaining ear 8 which is attached to the top end of the post 1. The plate 6 and ear 8 are provided with apertures for receiving fastening elements such as screws. The strap 5 is provided with a slot 9 so as to separate the journals 7 from each other whereby the lever 10 may be pivoted between the journals 7 by means of the pin 11. This lever 10 is curved as shown in Figure 1 so that when same is in a locked position it may be easily grasped by the operator so as to place the fastening device in an open position as will be evident as the description proceeds. A bale 12 is provided at one end with the parallel extending ear 13 so that it may be pivotally attached to the lever 10 intermediate its ends as is shown in Figure 1. This bale 12 is adapted to be received over the top end of the gate post 2 and the lever 10 will be pivoted upon the pin 11 so that its free end will abut the fence post 1. This operation will tend to pull the gate post 2 toward the fence post 1 and thus place the wires 3 in a taut position.

From the foregoing it will be apparent that when the gate is closed the gate post may be drawn bodily toward the adjacent fence post upon the actuation of the lever 10. When so positioned the gate wires 3 will be tightened and displacement of the lever 10 will be prevented by reason of its position as shown in Figure 1 since the pivot pin 14 will be situated below the pivot point 11 of the lever 10.

As numerous changes in form, proportion, and in the minor details of construction may be resorted to without departing from the spirit of this invention, I do not wish to be limited to the construction herein shown and described other than as claimed.

Having thus described my invention what I claim as new is:—

In combination, a fence post, a gate post, a strap comprising a plate having a slot therein and curved adjacent the slot so as to form spaced journals and a retaining ear, means for attaching the retaining ear and the plate to one of the posts, a lever pivotally mounted at one end to the journals of the strap, and a loop pivotally attached to the lever intermediate its ends and adapted to engage the other post.

In testimony whereof I affix my signature in presence of two witnesses.

CECIL P. RUPPE.

Witnesses:
F. W. IRWIN,
HELEN ISRAEL.